US005196924A

United States Patent [19]

Lumelsky et al.

[11] Patent Number: 5,196,924

[45] Date of Patent: Mar. 23, 1993

[54] LOOK-UP TABLE BASED GAMMA AND INVERSE GAMMA CORRECTION FOR HIGH-RESOLUTION FRAME BUFFERS

[75] Inventors: Leon Lumelsky, Stamford, Conn.; Calvin B. Swart, Poughkeepsie, N.Y.; John L. Pittas, Bethel, Conn.; Sung M. Choi, White Plains, N.Y.; Alan W. Peevers, Berkeley, Calif.

[73] Assignee: International Business Machines, Corporation, Armonk, N.Y.

[21] Appl. No.: 733,576

[22] Filed: Jul. 22, 1991

[51] Int. Cl.[5] .......... H04N 5/202

[52] U.S. Cl. .......... 358/32; 358/461; 358/164

[58] Field of Search .......... 358/32, 163, 164, 213.17, 358/461

[56] References Cited

U.S. PATENT DOCUMENTS 4,217,574 8/1980 Anderson .
4,317,114 2/1982 Walker .
4,394,688 7/1983 Iida et al. .
4,438,495 3/1984 Collins et al. .
4,534,059 8/1985 Yamada .
4,568,978 2/1986 Cosh .
4,599,611 7/1986 Bowker et al. .
4,688,095 8/1987 Beg et al. .
4,727,434 2/1988 Kawamura .
4,786,968 11/1988 Kutner .
4,800,442 1/1989 Riseman et al. .
4,805,013 2/1989 Dei et al. .
4,931,864 6/1990 Kawamura et al. .
4,999,702 3/1991 Knierim et al. .......... 358/32
5,012,163 4/1991 Alcorn et al. .......... 358/164 X
5,047,861 9/1991 Houchin et al. .......... 358/164 X
5,081,524 1/1992 Tsuruoka et al. .......... 358/32
5,089,890 2/1992 Takayama .......... 358/164
5,103,298 4/1992 Kashimura et al. .......... 358/164 X

*Primary Examiner*—James J. Groody
*Assistant Examiner*—Mark R. Powell
*Attorney, Agent, or Firm*—Perman & Green

[57] ABSTRACT

An image display system includes an input to a source (10, 12, 14) of image pixel data wherein each pixel is expressed as an M-bit value within a non-linear range of values. A first LUT (16) is coupled to an output of the source for converting each M-bit pixel value to an N-bit value within a linear range of values. An image memory, or frame buffer (18), has an input coupled to an output of the first LUT for storing the N-bit pixel values. The system further includes a second LUT (20) coupled to an output of the frame buffer for converting N-bit pixel values output by the frame buffer to P-bit pixel values within a non-linear range of values. The converted values are subsequently applied to a display (24). In an exemplary embodiment, the first LUT stores gamma corrected pixel values and the second LUT stores inverse gamma corrected pixel values. Preferably the second LUT stores a plurality of sets of inverse gamma corrected pixel values. Also, the frame buffer stores, for each of the N-bit pixel values, a value that specifies a particular one of the plurality of sets of inverse gamma corrected pixel values for use in converting an associated one of the N-bit pixel values.

31 Claims, 4 Drawing Sheets

LOOK-UP TABLE BASED GAMMA AND INVERSE GAMMA CORRECTION FOR HIGH-RESOLUTION FRAME BUFFERS

CROSS REFERENCE TO RELATED PATENT APPLICATION

This patent application is related to the following commonly assigned U.S. patent application: Ser. No. 07/733,950, filed Jul. 22, 1991, entitled "High Definition Multimedia Display" S. Choi et al.

1. Field of the Invention

This invention relates generally to image display apparatus and method and, in particular, to apparatus and method for applying a non-linear transform to a displayed image.

2. Background of the Invention

The light output of a phosphor from a cathode-ray tube (CRT), also referred to herein as a monitor, exhibits a power-law relationship to a video signal voltage applied to the CRT's cathode. To compensate for this non-linear behavior, the video signal is predistorted with a power-law function which is the inverse of that performed by the CRT. The resultant signal modulates the CRT cathode such that a linear transition of the light levels in the scene or image produce a linear transition in the light output of the CRT phosphors.

CRT light output (luminance) is defined by the power law function $L=E^y$, where E is video signal voltage and y is the power function exponent, referred to as gamma. Gamma is typically in the range of 2 to 3 for most CRT displays. To produce linear transitions in CRT light output, E is transformed to E, by the relation $E'=E^{1/y}$. This mathematical process is known as an inverse gamma function or, more commonly, as gamma correction. Image data which has been gamma corrected can, in turn, be linearized by applying the gamma function $E=E'^y$ to the data. This process is known as inverse gamma correction.

FIGS. 1*a*–1*d* illustrate the function of gamma correction during image reproduction. In these Figures a human observer is replaced with a photometer so as to quantify the light output of the monitor. In computer graphics systems, wherein an image is synthesized by the computer, the computer/renderer/database behavior, which generates the image, is functionally identical to the camera in the image reproducer chain. Inverse gamma correction therefore applies the monitor's function to a gamma-corrected input signal, yielding a linearized output.

In digital video systems, gamma correction may be performed on an image using two distinct techniques. A first technique performs gamma correction on each picture element (pixel) as it is generated by the imaging system. Subsequently, these gamma corrected pixels are stored in an image memory, referred to as a frame buffer. Gamma corrected pixels are then read from the frame buffer and presented to a digital-to-analog converter (DAC) for conversion to an analog signal to drive the CRT. However, in that gamma correction is a nonlinear operation, two undesirable effects result.

First, any additional operations performed on these pixels, for example linear mixing of two images, must consider the mathematical impact of the gamma corrected values upon the resultant value, since $\alpha A+(1-\alpha) B \neq [\alpha A'+(1-\alpha) B']^{\gamma}$ (where A and B are the linear pixel values, A' and B' are the gamma corrected pixel values, and $\alpha$ is the mixing ratio). Hence, a mixing operation must first inverse gamma correct the two pixels before mixing, and then gamma correct the result before storage. This is obviously a time consuming process and may be impractical for large numbers of pixels.

Second, as will be illustrated below, a gamma corrected integer pixel requires more bits than a linear integer pixel in order to uniquely define an identical set of intensity values. This in turn requires a larger frame buffer and long-word arithmetic capability.

A second technique stores and performs mathematical operations upon linear pixel values, and then performs gamma correction just prior to converting the pixels to an analog voltage by means of a look-up table (LUT) operation. The linear pixel values read from the frame buffer are used as an index to a memory (LUT) whose contents have been precalculated to satisfy the above mentioned gamma correction equation. It is the LUT's contents which are then applied to the DAC.

Performing gamma correction on integers with $y>1$ requires that the output set of integers contain more numbers than the input set, in order to maintain unique numbers. This can be observed when performing gamma correction on 8-bit integers (a common pixel size for digital video samples) for $y=2.0$. The transformed 8-bit output integers exhibit 64 duplicates, for a loss of 25% of the input set values. Referring to Table 1 in Appendix A it can be seen that increasing y to only 2.2 yields 72 duplicates for a loss of over 28%. Clearly, losses of these magnitudes are unacceptable in a high quality digital video system.

The use of a look-up memory or look-up table (LUT) to provide gamma correction has been previously employed as indicated by the following U.S. Patents.

In U.S. Pat. No. 4,805,013, issued Feb. 14, 1989, entitled "Image Data Conversion System" to Dei et al. there is disclosed the use of a RAM for storing a gamma conversion table. A CPU is enabled to load gamma conversion data that corresponds to a gamma conversion curve calculated by the CPU into the RAM.

In U.S. Pat. No. 4,394,688, issued Jul. 19, 1983, entitled "Video System Having an Adjustable Digital Gamma Correction for Contrast Enhancement" to Iida et al. there is disclosed a video system that includes a RAM in which video data is altered in accordance with the contents of a table look-up that is temporarily written therein. A ROM device stores a plurality of different table look-ups, each containing data representing a different gamma correction. A CPU obtains a table look-up from the ROM and writes same into the RAM. This technique enables the selection of only a single table look-up, and therefore a single gamma correction per image.

In U.S. Pat. No. 4,688,095, issued Aug. 18, 1987, entitled "Programmable Image-Transformation System" to Beg et al. there is described an image processing system having a multiplexor that supplies address signals to a look-up table whose resulting output is applied as data to a frame buffer. By changing selection signals applied to the multiplexor, it is said to be possible to use this system alternately for transformations dependent only on newly generated data, transformations dependent only on stored data, and transformations dependent on both. The look-up table may store different correction functions for each of 16 different combinations of camera and display device. The look-up table address is formed from a combination of possible sources including an output of an eight bit A/D and the output of a four bit register. In operation, a computer loads the look-up table and, if necessary, loads a value into the register to designate a portion of the look-up table to be used. The disclosure of Beg et al. permits gamma correction to be performed only on incoming video data from the A/D and, if the A/D data is linearized, it is not re-gamma corrected before DAC processing and display. As a consequence, if non-linearized data were to be placed in the frame buffer of Beg, any operation performed upon this data must compensate for the non-linear data. Furthermore, Beg et al. sample a gamma corrected signal with eight-bit accuracy and effectively do not use at least 2-bits/pixel in the frame buffer when linearizing a gamma corrected pixel.

In U.S. Pat. No. 4,568,978, issued Feb. 4, 1986, entitled "Method of a Circuit Arrangement for Producing a Gamma Corrected Video Signal" to Cosh there is disclosed a method for correcting a video signal by a gamma correction factor. A gamma correction circuit forms a logarithm of an input signal and a logarithm of a correction factor. The two logarithmic signals are summed and an anti-logarithm of the exponential of the summed signal is taken. PROMs are employed for storing conversions. Cosh notes that for each input code to translate to a unique output code the output code must have four times the resolution of the input code. For example, if the input is defined by 10 bits the output should have 12 bits.

What is not taught by these U.S. Patents, and what is thus one object of the invention to provide, is a method for determining an optimum number of bits required for a gamma correction look-up table output so as to achieve unique values for a specified number of input bits and for a selected range of gamma values.

It is a further object of the invention to provide an image generation system that includes an image buffer that receives and stores linear, gamma corrected digital data and that outputs the linear data to an inverse gamma corrector.

It is another object of the invention to provide a pixel-by-pixel selection of a function to be applied to each pixel so as to enable a gamma windowing function to be implemented, wherein a foreground gamma correction is applied to a window in a display, the foreground gamma correction being different than a background gamma correction.

It is another object of the invention to provide a dynamically programmable LUT memory in combination with a frame buffer having one or more (N-bit+W-bit) planes, where N-bits represent linear information, such as color, and wherein W-bits represent a display window identifier.

SUMMARY OF THE INVENTION

The foregoing and other problems are overcome and the objects of the invention are realized by a digital video system architecture and method which provides a powerful and flexible means of performing non-linear transformations upon digital image data. The invention employs read/write look-up table memories to perform arbitrary non-linear operations upon image data, either over an entire image or within user-defined windows into the image. The teaching of the invention is particularly useful for performing gamma and inverse gamma correction to image data, but may also be applied to provide enhancement and restoration capabilities for image analysis. The teaching of the invention may further be applied so as to modify an image to obtain a desired aesthetic effect.

The invention provides method and apparatus for performing gamma correction upon digital video values on a per pixel basis with minimal or no loss of information during the transform process. The invention pertains to both the transformation of linear intensity values to gamma corrected values and to the transformation of gamma corrected intensity values to linear values.

In that gamma correction and inverse gamma correction are specific cases of a more general class of non-linear transforms of image intensity, the teaching of the invention may employed so as to alter the transfer characteristic of the video display generally. Thus, analytic or aesthetic enhancements of the image may be accomplished.

In accordance with the invention, an image processing system includes an input to a source of image pixel data wherein each pixel has an M-bit value within a non-linear range of values. A first LUT is coupled to an output of the source and converts each M-bit pixel value to an N-bit value within a linear range of values. An image memory, or frame buffer, has an input coupled to an output of the first LUT and stores the linear N-bit pixel values. The system further includes a second LUT coupled to an output of the frame buffer for converting N-bit pixel values output by the frame buffer to P-bit pixel values within a non-linear range of values. The converted values are subsequently applied to a display.

In an exemplary embodiment, the first LUT stores gamma corrected pixel values and the second LUT stores inverse gamma corrected pixel values.

Preferably the second LUT stores a plurality of sets of inverse gamma corrected pixel values. Also, the frame buffer further stores, for each of the N-bit pixel values, a value that specifies a particular one of the plurality of sets of inverse gamma corrected pixel values for use in converting an associated one of said N-bit pixel values.

BRIEF DESCRIPTION OF THE DRAWING

The above set forth and other features of the invention are made more apparent in the ensuing Detailed Description of the Invention when read in conjunction with the attached Drawing, wherein:

FIGS. 1*a*-1*d* illustrate the process of gamma correction and inverse gamma correction, wherein FIG. 1*a* shows a linear output of a camera, FIG. 1*b* illustrates a gamma correction that is applied to the camera output, FIG. 1*c* shows the inverse gamma correction applied at a display (monitor), and FIG. 1*d* shows the output of a photometer that is a linear function due to the gamma correction applied to the camera output;

DETAILED DESCRIPTION OF THE INVENTION

Figure 1A:
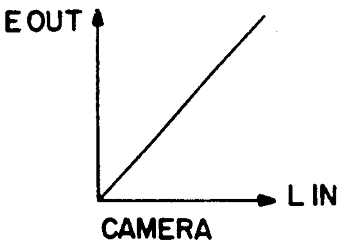
FIG. 1A (PRIOR ART)
Figure 1C:
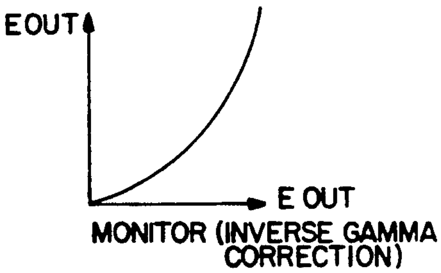
FIG. 1C (PRIOR ART)
Figure 1B:
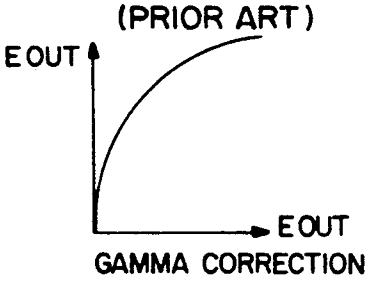
FIG. 1B (PRIOR ART)
Figure 1D:
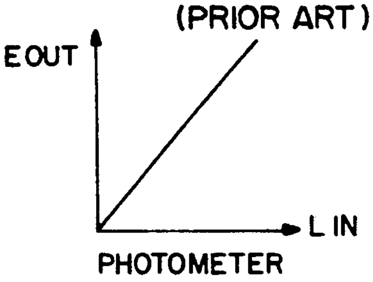
FIG. 1D (PRIOR ART)
Figure 2:
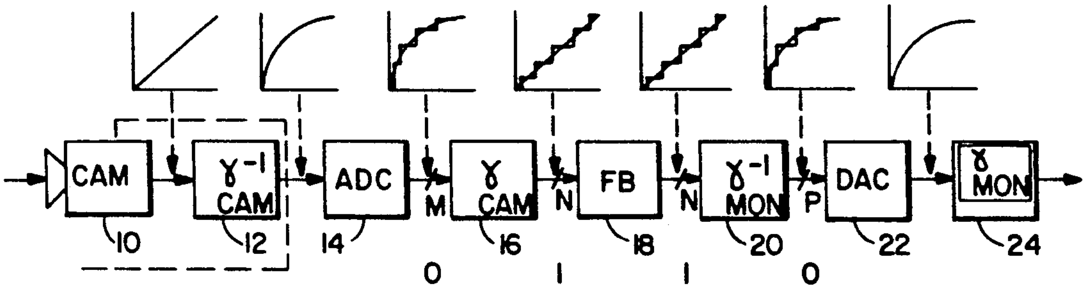
FIG. 2 illustrates a simplified look-up table based inverse gamma correction/gamma correction block diagram for a digital video system.

FIG. 2 illustrates a simplified block diagram of a look-up table based inverse gamma correction/gamma correction technique for use in a digital video system. Signal inputs from the camera 10 and outputs to monitor 24 are presumed to be analog. The inputs and outputs of the constituent blocks are indicated to be analog or digital and linear or non-linear by the attendant pictographs. The gamma correction block 12 following the camera 10 is an analog function typically built into the camera 10. Following the gamma correction block 12, that is, the output of the camera 10, is an analog-to-digital converter (ADC) 14 that provides M digital outputs to the address inputs of a first LUT, specifically an inverse gamma correction (IGC) LUT 16. The output of LUT 16 is N-bits that are applied to an input of a frame buffer (FB) 18. The output of FB 18 is N-bits that are applied to the address inputs of a second LUT, specifically a gamma correction (GC) LUT 20. The output of GC LUT 20 is P-bits ($P \geqq N$) of digital gamma corrected video data that is applied to an input of a DAC 22. The output of DAC 22, for a color system, is three analog signals. These three analog signals are a red (R) analog signal, a blue (B) analog signal, and a green (G) analog signal. Analog signals are applied to monitor 24, resulting in the display of a gamma corrected image.

For a high quality camera 10 the operation of the gamma correction block 12 may be disabled. Thus, the outputs to the ADC 14 are linear and the gamma correction action of the IGC LUT 16 is suppressed. Also, for image data generated by a source other than a camera, such as by a digital computer, linear video data may be applied directly to the FB 18. In any case, the approach of the system is to preserve linear color representation in the FB 18.

Figure 3:
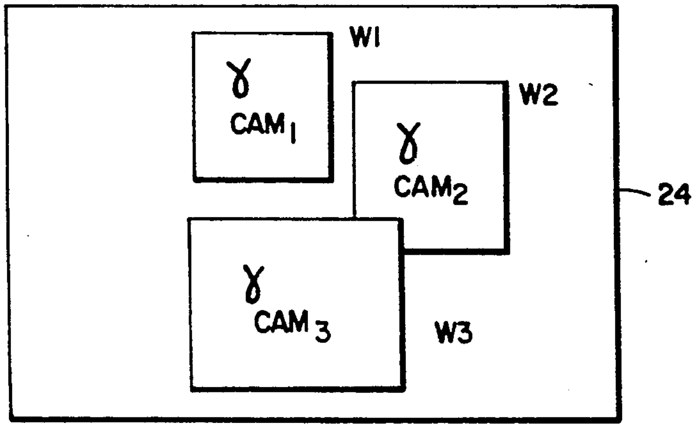
FIG. 3 illustrates a window-based graphic system that employs a LUT-based inverse gamma correction technique to mix images from cameras with different gamma corrections.

FIG. 3 illustrates a window based graphics system that employs the LUT-based inverse gamma correction technique if FIG. 2 to mix images from sources, such as cameras, having different gamma corrections. By applying the appropriate inverse gamma correction to each camera source, in real time, all images are linearized in the FB 18 and are therefore displayed on a common monitor 14 without losing intensity values in any of the windows.

While the LUT gamma correction technique described thus far provides a fast and inexpensive means of performing non-linear transforms upon pixel values, two enhancements may be made. Specifically, in that the pixel values which serve as the addresses into the LUTs and the data read from the LUTs are integers, loss of information, and therefore errors, may be produced by gamma correction if insufficient attention is given to the range of values which are required to uniquely represent all of the input set of values in the output set of values.

Figure 4:
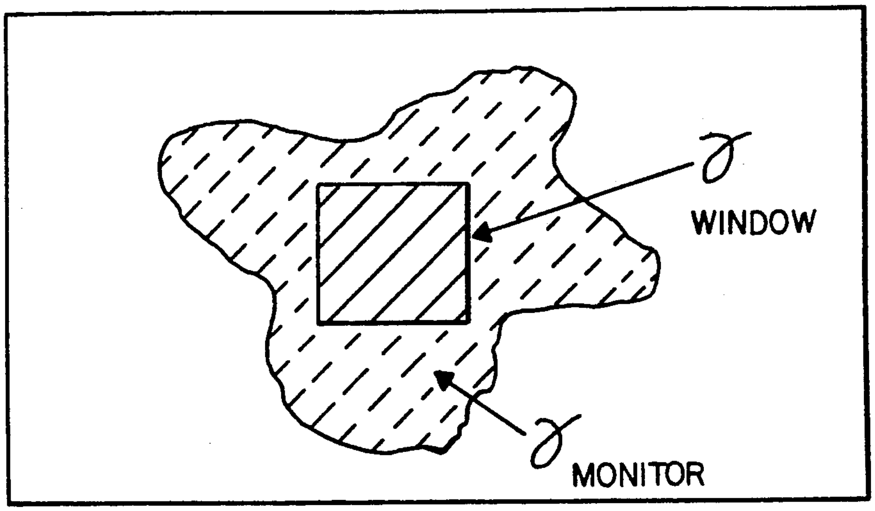
FIG. 4 illustrates the simultaneous the use of different gamma functions to obtain contrast expansion.

Secondly, since the LUT based gamma correction technique of the invention does not affect the pixel values stored in the FB 18, a separate means is provided to provide a pixel-accurate gamma window function. In this case a user, on a pixel-by-pixel basis, selects which one of a plurality of precalculated gamma functions are to be applied to specific areas (windows) on the display. By example, FIG. 4 shows the simultaneous the use of different gamma functions to obtain contrast expansion, and illustrates a technique whereby a user expands low contrast areas, or alternately compresses high contrast areas, within a window in order to observe image detail which may otherwise be unintelligible.

In accordance with an aspect of the invention, a method for determining a minimum number of bits required for the LUT output, to achieve unique values for a specified number of input bits and for a selected range of gamma values, is now presented. More specifically, this method determines a scaling coefficient S which, when used with the identity relation $E=[S(e)1\text{-}/y/S]^{y}$, provides recovery of all integer values of E. Since this relation is the mathematical equivalent of the inverse gamma function (gamma correction) performed by the digital imaging system and the gamma function performed by the monitor 24, the coefficient S determines the number of bits of any intermediate integers used in the transform and inverse transform process.

For a case where the camera gamma is not equal to the monitor gamma, $P \neq M$, and the scale factor S is found to satisfy the following relations:

$$O=INT[P-1)(I/N-1)^{1/y}+0.5] \text{ and}$$

$$I=INT[(N-1)(O/P-1)y+0.5],$$

where N=number of linear input levels, P=number of gamma corrected output levels, $(I/N-1)$ and $(O/P-1)$ are normalized input and output values, respectively, $S=P-1$, and INT is a truncating integer function. The above mentioned identity equation is obtained by substituting the equation for O into that for I. Therefore, for $N=\log_{2n}$ number of input bits, $P=(N+1)$ for $y>1$. The value of P is increased until the identity is satisfied, i.e. no duplicates are generated. The tables shown in Appendices A and B, respectively, illustrate the effect of increasing P from 8 to 10 bits for $y=2.2$. Appendix A shows the large number of duplicate values produced for P=8-bits, while Appendix B shows that with P=10-bits that no duplicate values are generated. As a result, there is no loss of intensity information over the range of input bits. It can be empirically determined that for $N=8$, $P=10$ satisfies the identity relation for $1 \leqq \gamma Y \leqq 4.2$.

Performing inverse gamma correction, i.e. linearizing intensity which was previously gamma corrected, requires a smaller output data set then the input data set. By example, this may be required after sampling a video camera which has a gamma corrected analog output, as is frequently the case. The IGC LUT memory 16 operating at a sample clock frequency instantaneously performs the transform. From the above example, a 10-bit (M) camera sample is used as the index to the IGC LUT 16 which generates an 8-bit (N) linear output value for $1 \leqq \gamma \leqq 4.2$. This is an efficient process since the resultant 8-bit transformed sample may then be directly mixed with other 8-bit linear values so as to form composite video images in real time.

Figure 5:
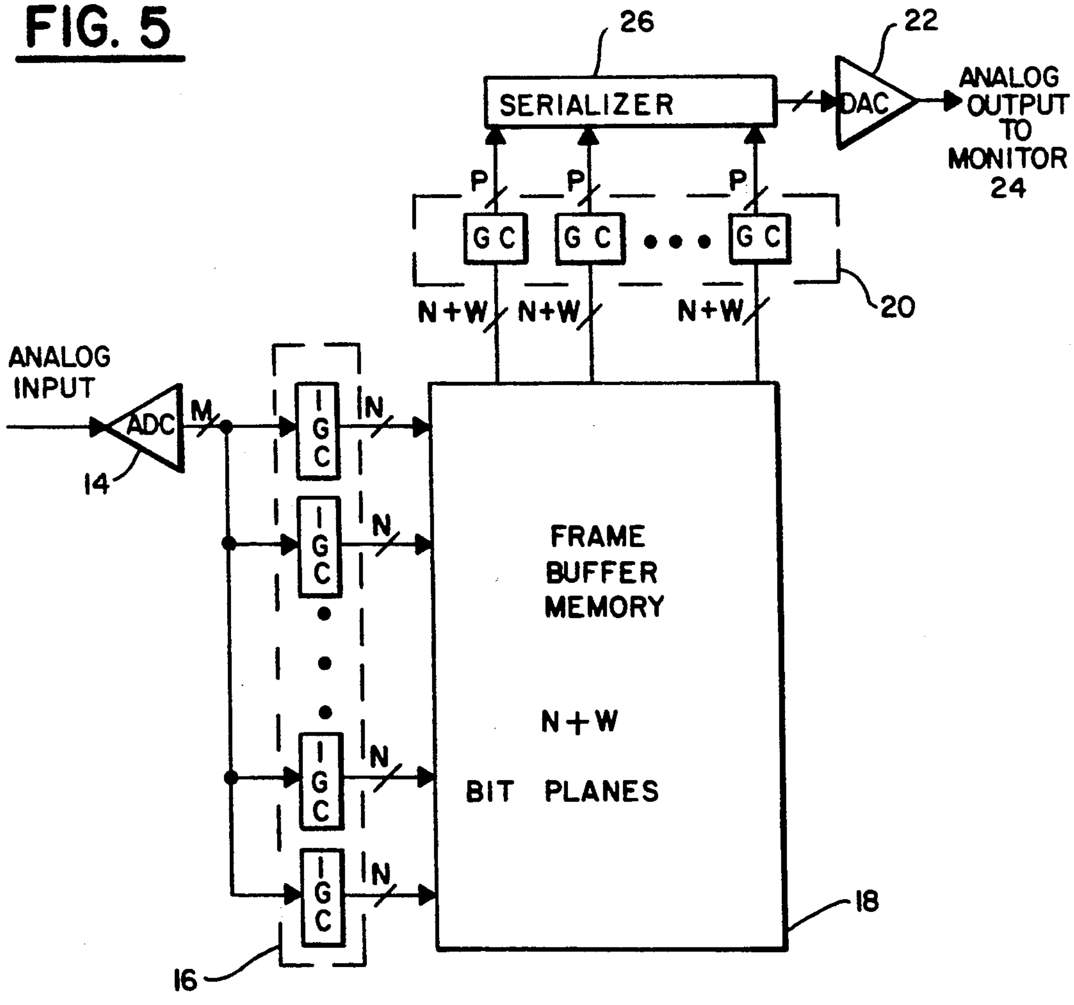
FIG. 5 shows a frame buffer memory constructed so as to have a plurality of input gamma correctors and a plurality of output gamma correctors.

The block diagram of FIG. 5 shows in greater detail data paths using the integers I and O. When digitizing a gamma corrected analog input, as from a camera, care should be taken when mapping the larger data set O to the smaller data set I. A median value method may be employed to select which intermediate numbers in the O set are assigned to those in the I set. The use of a median value may be illustrated by an example taken from Table 2 of Appendix B. The analog input is digitized with 10-bit accuracy. Any number from 0 to 1023 may be obtained at the output of the ADC 14, such as the values 264, 265, 266, etc. In order to determine the corresponding number at the output (O) of the LUT 16 for such intermediate inputs (I) a median value is determined. For example, the median value of 264 and 274 is 268, and the median value of 255 and 264 is 260. Thus, to all ADC 14 generate inputs between, by example, 260 and 268 only one output number (13) is assigned.

In FIG. 5 the FB 18 has a plurality of N+W-bit planes, where N-bits represents linear color information and where W-bits represents a window identification number (WID). All bit planes of FB 18 are accessible by a host (not shown). The gamma compensated input source is sampled with the ADC 14, which has M bits per pixel output. The input data is converted to linear data with Inverse Gamma Correction LUT 16 which outputs N bits per pixel. On the video output, for each pixel there are N+W bits. The N bit linear color data is gamma corrected with one of $2^W$ gamma correction tables stored within the Gamma Correction Block LUT 20, based on WID, which outputs P bits per pixel. These P bits are in turn loaded into the DAC 22 to be displayed on the monitor 24. This technique supports simultaneous multiple gamma corrections based on the WID associated with each pixel stored in the FB 16. Thus, there may be as many as $2^W$ different gamma corrected windows present within the system video output, as shown in FIG. 3 for the case of three gamma corrected windows (W1, W2, W3).

Input Device

Figure 6:
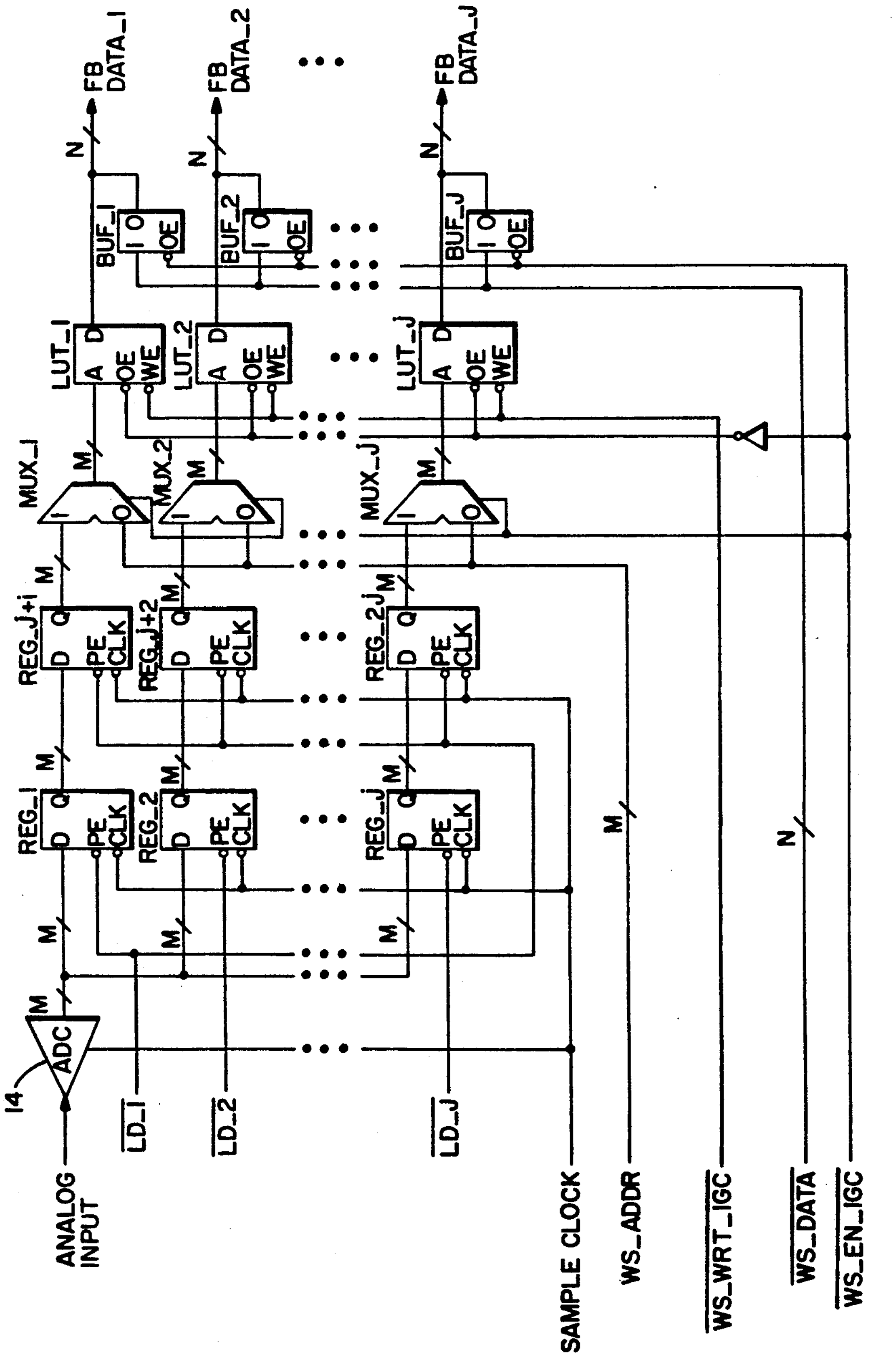
FIG. 6 illustrates in greater detail the input inverse gamma correctors shown in FIG. 5.

The following is the description of the input inverse gamma correction logic as shown in FIG. 6. The gamma corrected analog input signal, such as a signal from the video camera 10, is sampled and converted to M-bit digital data by the ADC 14. The linearization of the sampled gamma corrected data is performed by the IGC LUTs 16 which convert M-bits into N-bits. The value of M is determined, as described above, by the maximum value of input device gamma y. As indicated above, M=10 for N=8 for reasonable values of y.

It may be desirable to write the sampled data into the FB 16 in parallel. For example, if Video RAM (VRAM) chips utilized to implement the FB 16 have a random port bandwidth of 16.6 Mhz (60 nS cycle time), then in order to store a HDTV camera signal sampled at 74.25 Mhz, the memory must be interleaved at least 5 (j=5) ways to provide sufficient bandwidth to store the sampled data. The transformation may be accomplished immediately after the ADC 14, before parallelization, by employing a fast LUT 16 which matches the period of a sample clock (SAMPLE_CLOCK). Alternately, the transformation may be done after parallelization, by using a slower LUT 16 which matches the FB 18 cycle period. The second method is illustrated in FIG. 6 and is preferred over the first, since slower LUT 16 memory is more readily available and operates independently of the high speed sample clock.

The circuitry of FIG. 6 functions in the following manner. The analog input signal is sampled and clocked at the ADC 14 every sample clock period (SAMPLE_CLOCK). The output of the ADC 14 is loaded into registers REG_1 through REG_J in a round robin fashion via signals LD_1 through LD_j, respectively. Thus, the first sampled data is loaded into REG_1 with the LD_1-strobe, the second sampled data is loaded into REG_2 with LD_2-strobe, and so on, until the last round robin LD_j strobe is generated. On the following SAMPLE_CLOCK period, a new robin cycle is initiated by again strobing LD_1. Simultaneously, the data already stored within REG_1 through REG_j is parallel loaded into REG_j+1 through REG_2j. Thus, the LD_1 strobe controls the loading of REG_1 and all of the registers REG_j+1 through REG_2j.

The data stored in REG_j+1 through REG_2j are used as address inputs to a set of IGC LUTs 16, which in turn provide N bit linear data to the FB 18. The contents of LUTs 16 are updated from the local host via host computer address bus (WS_ADDR); host computer data bus (WS_DATA); and control signals IGC LUT Enable (WS_EN_IGC—) and IGC LUT write strobe (WS_WRT_IGC—). Normally, both WS_EN_IGC— and WS_WRT_IGC— are deasserted. When deasserted, WS_WRT_IGC— selects multiplexors (MUX_1 through MUX_j) outputs to be sourced from registers REG_j+1 through REG_2j, thereby providing the sampled data from the ADC 14. This signal also forces local host data buffers (BUF_1 through BUF_j) into a high impedance mode, and enables the output of LUTs 16, thus enabling the linearized color data to be available to FB 18. During an IGC LUT 16 update cycle by the local host, the local host first asserts the WS_EN_IGC— signal, which causes MUX_1 through MUX_j to select the WS_ADDR as address inputs to the LUTs 16, and disables the LUTs 16 outputs. The BUF outputs are enabled such that WS_DATA is used as the input to the LUTs 16 data ports. Subsequently, the local host strobes WS_WRT_IGC— which loads the WS DATA into the LUTs 16 at the address specified by WS_ADDR.

Video Output Device

Figure 7:
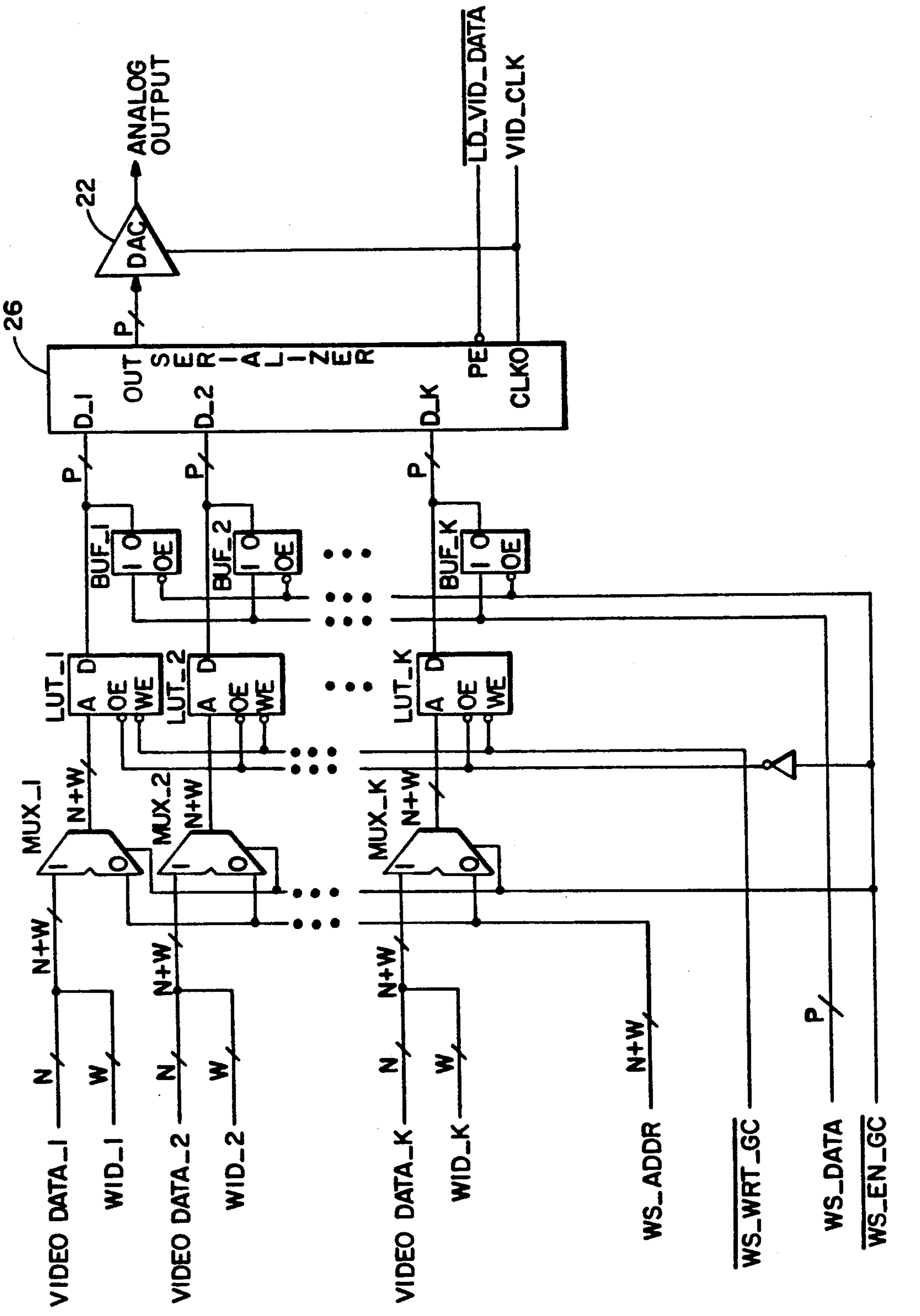
FIG. 7 illustrates in greater detail the output gamma correctors shown in FIG. 5.

The following is the description of the video output device shown in FIG. 7. It may be required that the serial output port of the FB 18 be parallelized to achieve a desired video bandwidth. For example, a 60 Hz 1280×1024 resolution display requires a bandwidth of 110 MHz. Since a typical VRAM has serial output bandwidth of less than 40 MHz, the FB 18 serial output must be interleaved at least four ways. The interleaved serial outputs of the FB 18 are then loaded into the serializer 26 which is capable of being shifted at the video clock rate.

There are two methods to implement gamma correction using the GC LUT memories 20. The transformation may be done after serialization, just before the DAC 22, by using high speed LUTs 20 that match the video clock period. Alternately, gamma correction can be accomplished before serialization by employing slower LUT memories 20 that match the VRAM serial output cycle period. The second method is preferred over the first method in that slower LUT memory is more readily available and operates independently of the video clock period. FIG. 7 illustrates this second, preferred approach.

N-bits of linear color value is gamma corrected by the GC LUTs 20. The result is P-bits of gamma corrected data which is input to the DAC 22, via serializer 26. DAC 22 thus has a P-bit wide input.

As was discussed previously, the actual value of P is a function of the required gamma value for video output correction. For the case where the monitor gamma and camera gamma are relatively close, then P may equal M. For some cases the output correction may require more bits or the same number of bits as the input correction. For example, if the gamma of the monitor is equal to 1, then P may equal N. As was previously stated, a general rule is that P≧N.

For certain special effects, different gamma corrections may be applied based on the value of WID, as illustrated in FIGS. 3 and 4. This is accomplished by FB 18 containing the plurality of N+W-bit planes, where N-bits represent linear color data and W-bits the WID. Therefore, each pixel is represented, in each FB 18 memory plane, by N+W-bits of data. N-bit video data from the FB 18 is concatenated with the W-bit WID. As an example, if WID is represented by three bits then $2^3$, or eight, different gamma corrections can be simultaneously in effect for a given display screen frame. This corresponds to eight distinct windows.

It is noted that different gamma corrected pixel regions can be overlapped because, after gamma correction, all images are linearized. For example, in FIG. 3 it is assumed that window 3 was sampled last and also incidentally overlaps window 2.

The images are not overlayed, but a portion of the overlap window is rewritten during sampling or rewritten by the local host. If mixing of two images is required the mixing does not occur in real time. By example, sampling is disabled in window 2 and a portion of the window 2 which may be overlapped is stored by the local host. Sampling is again enabled and window 3 is sampled. Sampling is then disabled and the local host then mixes the image pixels from each of the overlapped regions.

During normal operation, both a local host enable gamma correction signal (WS_EN_GC—) and a local host write gamma correction (WS_WRT_GC—) signal are deasserted. As such, WS_EN_GC— forces multiplexors (MUX_1 through MUX_k) to select the concatenated VIDEO_DATA and WID; disables local host data buffers (BUF_1 through BUF_k); and enables the LUT 20 output. Therefore, the output of the LUTs 20 provide the gamma corrected P-bit value, based on an address supplied by the N-bit linear color data, from a selected one of the $2^W$ gamma correction tables, based on WID. That is, by changing the value of WID different regions of the GC LUT 20 are addressed.

For the example shown in FIG. 3, the pixels within window 1 are gamma corrected from a first correction table stored within GC LUT 20, the pixels within window 2 are gamma corrected from a second correction table stored within GC LUT 20, etc. The simultaneous use, within a display screen, of different correction tables enables image data from various sources to be displayed at, for example, one brightness level. Also, different regions (windows) of a displayed image can be given different brightnesses or contrasts as desired for a particular application.

Data is shifted out of the serializer 26 at every video clock (VID_CLK). On every k-th VID_CLK, a signal LD_VID_DATA— is generated, which parallel loads parallel data, the output of LUTs 20, into the serializer 26 shift registers.

During a GC LUT 20 update cycle by the local host, the local host first asserts the WS_EN_GC— signal, which causes MUX_1 through MUX_K to select the WS_ADDR as the output of the MUXs. The assertion of the WS_EN_GC— signal also disables the LUT 20 outputs and enables the BUF outputs, such that WS_DATA is used as the input to the LUTs 20 data port. Subsequently, the local host strobes WS_WRT_GC—, which loads the WS_DATA into the LUTs 20 using the address provided by WS_ADDR.

It should be noted that for a R, G, B frame buffer 18, there are three sets of IGC LUTs 16 and GC LUTs 20, one for each of the R, G, B, data paths. However, there is only one WID path, since all R, G, B data bits are applied to the same window. Thus, a minimum number of bit planes is 3N+W for the RGB system. This provides independent gamma correction for each color component for both the input and the output of the FB 18.

The foregoing has disclosed methods and apparatus for performing non-linear pixel based intensity transforms, such as gamma and inverse gamma correction, upon digital video data. The use and design of LUT memories to perform these operations has been described. Also, use of a secondary pixel plane to select from multiple gamma functions in the LUT provides a windowing capability to specifically support multiple display gammas, in addition to generally performing non-linear image processing within a window. Furthermore, the significance of input-to-output number capacity has been addressed so as to minimize losses for gamma transforms in both directions. Also, a method for determining adequate integer number ranges for both transforms has been disclosed.

While the invention has been particularly shown and described with respect to a preferred embodiment thereof, it will be understood by those skilled in the art that changes in form and details may be made therein without departing from the scope and spirit of the invention.

APPENDIX A

TABLE 1

N = 256
P = 256
γ = 2.2
S = (P − 1) = 255

$$O = \mathrm{INT}\left[(P-1)\left(\frac{I}{N-1}\right)^{\frac{1}{\gamma}} + 0.5\right]$$

$$I = \mathrm{INT}\left[(N-1)\left(\frac{O}{P-1}\right)^{\gamma} + 0.5\right]$$

| I | | O | | I |
|---|---|---|---|---|
| 0 | 0.0000 | 0 | 0.0000 | 0 |
| 1 | 20.5427 | 21 | 1.0496 | 1 |
| 2 | 28.1508 | 28 | 1.9765 | 2 |
| 3 | 33.8479 | 34 | 3.0297 | 3 |
| 4 | 38.5764 | 39 | 4.0973 | 4 |
| 5 | 42.6945 | 43 | 4.0790 | 5 |
| 6 | 46.3835 | 46 | 5.8914 | 6 |
| 7 | 49.7501 | 50 | 7.0776 | 7 |
| 8 | 52.8632 | 53 | 8.0456 | 8 |
| 9 | 55.7705 | 56 | 9.0817 | 9 |
| 10 | 58.5065 | 59 | 10.1865 | 10 |
| 11 | 61.0968 | 61 | 10.9617 | 11 |
| 12 | 63.5617 | 64 | 12.1828 | 12 |
| 13 | 65.9168 | 66 | 13.0361 | 13 |
| 14 | 68.1751 | 68 | 13.9210 | 14 |
| 15 | 70.3469 | 70 | 14.8377 | 15 |
| 16 | 72.4412 | 72 | 15.7864 | 16 |
| 17 | 74.4652 | 74 | 16.7672 | 17 |
| 18 | 76.4252 | 76 | 17.7804 | 18 |
| 19 | 78.3267 | 78 | 18.8261 | 19 |
| 20 | 80.1744 | 80 | 19.9044 | 20 |
| 21 | 81.9723 | 82 | 21.0156 | 21 |

TABLE 1-continued

N = 256
P = 256
$\gamma$ = 2.2
S = (P − 1) = 255

$$O = INT\left[(P-1)\left(\frac{I}{N-1}\right)^{\frac{1}{\gamma}} + 0.5\right]$$

$$I = INT\left[(N-1)\left(\frac{O}{P-1}\right)^{\gamma} + 0.5\right]$$

| I | | O | | I | |
|---|---|---|---|---|---|
| 22 | 83.7241 | 84 | 22.1598 | 22 | |
| 23 | 85.4330 | 85 | 22.7443 | 23 | |
| 24 | 87.1018 | 87 | 23.9383 | 24 | |
| 25 | 88.7331 | 89 | 25.1657 | 25 | |
| 26 | 90.3292 | 90 | 25.7920 | 26 | |
| 27 | 91.8921 | 92 | 27.0698 | 27 | |
| 28 | 93.4238 | 93 | 27.7213 | 28 | |
| 29 | 94.9259 | 95 | 29.0498 | 29 | |
| 30 | 96.4000 | 96 | 29.7268 | 30 | |
| 31 | 97.8476 | 98 | 31.1064 | 31 | |
| 32 | 99.2699 | 99 | 31.8089 | 32 | |
| 33 | 100.6681 | 101 | 33.2398 | 33 | |
| 34 | 102.0434 | 102 | 33.9682 | 34 | |
| 35 | 103.3969 | 103 | 34.7051 | 35 | |
| 36 | 104.7294 | 105 | 36.2050 | 36 | |
| 37 | 106.0418 | 106 | 36.9679 | 37 | |
| 38 | 107.3351 | 107 | 37.7395 | 38 | |
| 39 | 108.6099 | 109 | 39.3088 | 39 | |
| 40 | 109.8670 | 110 | 40.1066 | 40 | |
| 41 | 111.1071 | 111 | 40.9131 | 41 | |
| 42 | 112.3308 | 112 | 41.7284 | 42 | |
| 43 | 113.5387 | 114 | 43.3853 | 43 | |
| 44 | 114.7314 | 115 | 44.2270 | 44 | |
| 45 | 115.9094 | 116 | 45.0775 | 45 | |
| 46 | 117.0731 | 117 | 45.9368 | 46 | |
| 47 | 118.2232 | 118 | 46.8050 | 47 | |
| 48 | 119.3600 | 119 | 47.6821 | 48 | |
| 49 | 120.4840 | 120 | 48.5680 | 49 | |
| 50 | 121.5955 | 122 | 50.3667 | 50 | |
| 51 | 122.6949 | 123 | 51.2794 | 51 | |
| 52 | 123.7827 | 124 | 52.2011 | 52 | |
| 53 | 124.8591 | 125 | 53.1317 | 53 | |
| 54 | 125.9244 | 126 | 54.0713 | 54 | |
| 55 | 126.9791 | 127 | 55.0199 | 55 | |
| 56 | 128.0234 | 128 | 55.9775 | 56 | |
| 57 | 129.0575 | 129 | 56.9442 | 57 | |
| 58 | 130.0818 | 130 | 57.9198 | 58 | |
| 59 | 131.0965 | 131 | 58.9045 | 59 | |
| 60 | 132.1018 | 132 | 59.8983 | 60 | |
| 61 | 133.0981 | 133 | 60.9011 | 61 | |
| 62 | 134.0855 | 134 | 61.9131 | 62 | |
| 63 | 135.0642 | 135 | 62.9341 | 63 | |
| 64 | 136.0345 | 136 | 63.9643 | 64 | |
| 65 | 136.9966 | 137 | 65.0035 | 65 | |
| 66 | 137.9506 | 138 | 66.0520 | 66 | |
| 67 | 138.8968 | 139 | 67.1096 | 67 | |
| 68 | 139.8353 | 140 | 68.1763 | 68 | |
| 69 | 140.7663 | 141 | 69.2522 | 69 | |
| 70 | 141.6900 | 142 | 70.3374 | 70 | |
| 71 | 142.6065 | 143 | 71.4317 | 71 | |
| 72 | 143.5160 | 144 | 72.5353 | 73 | |
| 73 | 144.4186 | 144 | 72.5353 | 73 | ** |
| 74 | 145.3145 | 145 | 73.6481 | 74 | |
| 75 | 146.2039 | 146 | 74.7701 | 75 | |
| 76 | 147.0868 | 147 | 75.9014 | 76 | |
| 77 | 147.9633 | 148 | 77.0420 | 77 | |
| 78 | 148.8337 | 149 | 78.1919 | 78 | |
| 79 | 149.6980 | 150 | 79.3510 | 79 | |
| 80 | 150.5564 | 151 | 80.5195 | 81 | |
| 81 | 151.4089 | 151 | 80.5195 | 81 | ** |
| 82 | 152.2557 | 152 | 81.6973 | 82 | |
| 83 | 153.0969 | 153 | 82.8844 | 83 | |
| 84 | 153.9326 | 154 | 84.0809 | 84 | |
| 85 | 154.7629 | 155 | 85.2867 | 85 | |
| 86 | 155.5879 | 156 | 86.5019 | 87 | |
| 87 | 156.4076 | 156 | 86.5019 | 87 | ** |

TABLE 1-continued

N = 256
P = 256
$\gamma$ = 2.2
S = (P − 1) = 255

$$O = INT\left[(P-1)\left(\frac{I}{N-1}\right)^{\frac{1}{\gamma}} + 0.5\right]$$

$$I = INT\left[(N-1)\left(\frac{O}{P-1}\right)^{\gamma} + 0.5\right]$$

| I | | O | | I | |
|---|---|---|---|---|---|
| 88 | 157.2223 | 157 | 87.7265 | 88 | |
| 89 | 158.0319 | 158 | 88.9605 | 89 | |
| 90 | 158.8365 | 159 | 90.2039 | 90 | |
| 91 | 159.6363 | 160 | 91.4567 | 91 | |
| 92 | 160.4313 | 160 | 91.4567 | 91 | ** |
| 93 | 161.2216 | 161 | 92.7190 | 93 | |
| 94 | 162.0073 | 162 | 93.9907 | 94 | |
| 95 | 162.7884 | 163 | 95.2718 | 95 | |
| 96 | 163.5651 | 164 | 96.5624 | 97 | |
| 97 | 164.3374 | 164 | 96.5624 | 97 | ** |
| 98 | 165.1053 | 165 | 97.8625 | 98 | |
| 99 | 165.8690 | 166 | 99.1721 | 99 | |
| 100 | 166.6285 | 167 | 100.4912 | 100 | |
| 101 | 167.3838 | 167 | 100.4912 | 100 | ** |
| 102 | 168.1351 | 168 | 101.8198 | 102 | |
| 103 | 168.8824 | 169 | 103.1579 | 103 | |
| 104 | 169.6257 | 170 | 104.5056 | 105 | |
| 105 | 170.3651 | 170 | 104.5056 | 105 | ** |
| 106 | 171.1007 | 171 | 105.8628 | 106 | |
| 107 | 171.8326 | 172 | 107.2295 | 107 | |
| 108 | 172.5607 | 173 | 108.6058 | 109 | |
| 109 | 173.2851 | 173 | 108.6058 | 109 | ** |
| 110 | 174.0059 | 174 | 109.9918 | 110 | |
| 111 | 174.7232 | 175 | 111.3873 | 111 | |
| 112 | 175.4369 | 175 | 111.3873 | 111 | ** |
| 113 | 176.1472 | 176 | 112.7923 | 113 | |
| 114 | 176.8541 | 177 | 114.2071 | 114 | |
| 115 | 177.5575 | 178 | 115.6314 | 116 | |
| 116 | 178.2577 | 178 | 115.6314 | 116 | ** |
| 117 | 178.9546 | 179 | 117.0654 | 117 | |
| 118 | 179.6482 | 180 | 118.5090 | 119 | |
| 119 | 180.3386 | 180 | 118.5090 | 119 | ** |
| 120 | 181.0259 | 181 | 119.9623 | 120 | |
| 121 | 181.7100 | 182 | 121.4252 | 121 | |
| 122 | 182.3911 | 182 | 121.4252 | 121 | ** |
| 123 | 183.0691 | 183 | 122.8978 | 123 | |
| 124 | 183.7442 | 184 | 124.3801 | 124 | |
| 125 | 184.4163 | 184 | 124.3801 | 124 | ** |
| 126 | 185.0854 | 185 | 125.8721 | 126 | |
| 127 | 185.7517 | 186 | 127.3738 | 127 | ** |
| 128 | 187.4151 | 186 | 127.3738 | 127 | |
| 129 | 187.0756 | 187 | 128.8853 | 129 | |
| 130 | 187.7334 | 188 | 130.4064 | 130 | |
| 131 | 188.3885 | 188 | 130.4064 | 130 | ** |
| 132 | 189.0408 | 189 | 131.9373 | 132 | |
| 133 | 189.6904 | 190 | 133.4780 | 133 | |
| 134 | 190.3374 | 190 | 133.4780 | 133 | ** |
| 135 | 190.9817 | 191 | 135.0284 | 135 | |
| 136 | 191.6235 | 192 | 136.5886 | 137 | |
| 137 | 192.2626 | 192 | 136.5886 | 137 | ** |
| 138 | 192.8993 | 193 | 138.1586 | 138 | |
| 139 | 193.5334 | 194 | 139.7383 | 140 | |
| 140 | 195.1650 | 194 | 139.7383 | 140 | ** |
| 141 | 194.7942 | 195 | 141.3279 | 141 | |
| 142 | 195.4210 | 195 | 141.3279 | 141 | ** |
| 143 | 196.0453 | 196 | 142.9273 | 143 | |
| 144 | 196.6673 | 197 | 144.5365 | 145 | |
| 145 | 197.2869 | 197 | 144.5365 | 145 | ** |
| 146 | 197.9042 | 198 | 146.1555 | 146 | |
| 147 | 198.5192 | 199 | 147.7844 | 148 | |
| 148 | 199.1319 | 199 | 147.7844 | 148 | ** |
| 149 | 199.7424 | 200 | 149.4231 | 149 | |
| 150 | 200.3506 | 200 | 149.4231 | 149 | ** |
| 151 | 200.9566 | 201 | 151.0717 | 151 | |
| 152 | 201.5605 | 202 | 152.7302 | 153 | |
| 153 | 202.1621 | 202 | 152.7302 | 153 | ** |

TABLE 1-continued

N = 256
P = 256
$\gamma = 2.2$
S = (P − 1) = 255

$$O = INT\left[(P-1)\left(\frac{I}{N-1}\right)^{\frac{1}{\gamma}} + 0.5\right]$$

$$I = INT\left[(N-1)\left(\frac{O}{P-1}\right)^{\gamma} + 0.5\right]$$

| I | O | | I | | |
|---|---|---|---|---|---|
| 154 | 202.7617 | 203 | 154.3985 | 154 | |
| 155 | 203.3591 | 203 | 154.3985 | 154 | ** |
| 156 | 203.9544 | 204 | 156.0767 | 156 | |
| 157 | 204.5476 | 205 | 157.7649 | 158 | |
| 158 | 205.1388 | 205 | 157.7649 | 158 | ** |
| 159 | 205.7280 | 206 | 159.4629 | 159 | |
| 160 | 206.3151 | 206 | 159.4629 | 159 | ** |
| 161 | 206.9002 | 207 | 161.1709 | 161 | |
| 162 | 207.4834 | 207 | 161.1709 | 161 | ** |
| 163 | 208.0646 | 208 | 162.8888 | 163 | |
| 164 | 208.6438 | 209 | 164.6166 | 165 | |
| 165 | 209.2211 | 209 | 164.6166 | 165 | ** |
| 166 | 209.7965 | 210 | 166.3544 | 166 | |
| 167 | 210.3701 | 210 | 166.3544 | 166 | ** |
| 168 | 210.9417 | 211 | 168.1021 | 168 | |
| 169 | 211.5115 | 212 | 169.8598 | 170 | |
| 170 | 212.0795 | 212 | 169.8598 | 170 | ** |
| 171 | 212.6457 | 213 | 171.6275 | 172 | |
| 172 | 213.2100 | 213 | 171.6275 | 172 | ** |
| 173 | 213.7726 | 214 | 173.4052 | 173 | |
| 174 | 214.3334 | 214 | 173.4052 | 173 | ** |
| 175 | 214.8924 | 215 | 175.1929 | 175 | |
| 176 | 215.4497 | 215 | 175.1929 | 175 | ** |
| 177 | 216.0053 | 216 | 176.9905 | 177 | |
| 178 | 216.5591 | 217 | 178.7982 | 179 | |
| 179 | 217.1113 | 217 | 178.7982 | 179 | ** |
| 180 | 217.6618 | 218 | 180.6159 | 181 | |
| 181 | 218.2106 | 218 | 180.6159 | 181 | ** |
| 182 | 218.7578 | 219 | 182.4437 | 182 | |
| 183 | 219.3033 | 219 | 182.4437 | 182 | ** |
| 184 | 219.8472 | 220 | 184.2815 | 184 | |
| 185 | 220.3895 | 220 | 184.2815 | 184 | ** |
| 186 | 220.9302 | 221 | 186.1293 | 186 | |
| 187 | 221.4693 | 221 | 186.1293 | 186 | ** |
| 188 | 222.0069 | 222 | 187.9872 | 188 | |
| 189 | 222.5429 | 223 | 189.8552 | 190 | |
| 190 | 223.0773 | 223 | 189.8552 | 190 | ** |
| 191 | 223.6102 | 224 | 191.7332 | 192 | |
| 192 | 224.1416 | 224 | 191.7332 | 192 | ** |
| 193 | 224.6715 | 225 | 193.6214 | 194 | |
| 194 | 225.1999 | 225 | 193.6214 | 194 | ** |
| 195 | 225.7268 | 226 | 195.5196 | 196 | |
| 196 | 226.2522 | 226 | 195.5196 | 196 | ** |
| 197 | 226.7762 | 227 | 197.4280 | 197 | |
| 198 | 227.2987 | 227 | 197.4280 | 197 | ** |
| 199 | 227.8198 | 228 | 199.3464 | 199 | |
| 200 | 228.3395 | 228 | 199.3464 | 199 | ** |
| 201 | 228.8577 | 229 | 201.2750 | 201 | |
| 202 | 229.3746 | 229 | 201.2750 | 201 | ** |
| 203 | 229.8900 | 230 | 203.2137 | 203 | |
| 204 | 230.4041 | 230 | 203.2137 | 203 | ** |
| 205 | 230.9168 | 231 | 205.1626 | 205 | |
| 206 | 231.4281 | 231 | 205.1626 | 205 | ** |
| 207 | 231.9381 | 232 | 207.1216 | 207 | |
| 208 | 232.4467 | 232 | 207.1216 | 207 | ** |
| 209 | 232.9540 | 233 | 209.0907 | 209 | |
| 210 | 233.4600 | 233 | 209.0907 | 290 | ** |
| 211 | 233.9647 | 234 | 211.0701 | 211 | |
| 212 | 234.4681 | 234 | 211.0701 | 211 | ** |
| 213 | 234.9701 | 235 | 213.0596 | 213 | |
| 214 | 235.4709 | 235 | 213.0596 | 213 | ** |
| 215 | 235.9704 | 236 | 215.0593 | 215 | |
| 216 | 236.4687 | 236 | 215.0593 | 215 | ** |
| 217 | 236.9657 | 237 | 217.0692 | 217 | |
| 218 | 237.4614 | 237 | 217.0692 | 217 | ** |
| 219 | 237.9559 | 238 | 219.0893 | 219 | |
| 220 | 238.4492 | 238 | 219.0893 | 219 | ** |
| 221 | 238.9413 | 239 | 221.1196 | 221 | |
| 222 | 239.4321 | 239 | 221.1196 | 221 | ** |
| 223 | 239.9217 | 240 | 223.1601 | 223 | |
| 224 | 240.4102 | 240 | 223.1601 | 223 | ** |
| 225 | 240.8974 | 241 | 225.2108 | 225 | |
| 226 | 241.3835 | 241 | 225.2108 | 225 | ** |
| 227 | 241.8684 | 242 | 227.2718 | 227 | |
| 228 | 242.3521 | 242 | 227.2718 | 227 | ** |
| 229 | 242.8347 | 243 | 229.3431 | 229 | |
| 230 | 243.3161 | 243 | 229.3431 | 229 | ** |
| 231 | 243.7964 | 244 | 231.4245 | 231 | |
| 232 | 244.2756 | 244 | 231.4245 | 231 | ** |
| 233 | 244.7536 | 245 | 233.5163 | 234 | |
| 234 | 245.2306 | 245 | 233.5163 | 234 | ** |
| 235 | 245.7064 | 246 | 235.6183 | 236 | |
| 236 | 246.1811 | 246 | 235.6183 | 236 | ** |
| 237 | 246.6547 | 247 | 237.7306 | 238 | |
| 238 | 247.1272 | 247 | 237.7306 | 238 | ** |
| 239 | 247.5986 | 248 | 239.8532 | 240 | |
| 240 | 248.0690 | 248 | 239.8532 | 240 | ** |
| 241 | 248.5383 | 249 | 241.9861 | 242 | |
| 242 | 249.0065 | 249 | 241.9861 | 242 | ** |
| 243 | 249.4737 | 249 | 241.9861 | 242 | ** |
| 244 | 249.9398 | 250 | 244.1292 | 244 | |
| 245 | 250.4049 | 250 | 244.1292 | 244 | ** |
| 246 | 250.8690 | 251 | 246.2827 | 246 | |
| 247 | 251.3320 | 251 | 246.2827 | 246 | ** |
| 248 | 251.7940 | 252 | 248.4466 | 248 | |
| 249 | 252.2550 | 252 | 248.4466 | 248 | ** |
| 250 | 252.7150 | 253 | 250.6207 | 251 | |
| 251 | 253.1740 | 253 | 250.6207 | 251 | ** |
| 252 | 253.6320 | 254 | 252.8052 | 253 | |
| 253 | 254.0890 | 254 | 252.8052 | 253 | ** |
| 254 | 254.5450 | 255 | 255.0000 | 255 | |
| 255 | 255.0000 | 255 | 255.0000 | 255 | ** |

184 unique + 72 duplicates = 256 total

APPENDIX B

TABLE 2

N = 256
P = 1024
$\gamma = 2.2$
S = (P − 1) = 1023

$$O = INT\left[(P-1)\left(\frac{I}{N-1}\right)^{\frac{1}{\gamma}} + 0.5\right]$$

$$I = INT\left[(N-1)\left(\frac{O}{P-1}\right)^{\gamma} + 0.5\right]$$

| I | O | | I | |
|---|---|---|---|---|
| 0 | 0.0000 | 0 | 0.0000 | 0 |
| 1 | 82.4126 | 82 | 0.9890 | 1 |
| 2 | 112.9342 | 113 | 2.0026 | 2 |
| 3 | 135.7898 | 136 | 3.0102 | 3 |
| 4 | 154.7595 | 155 | 4.0137 | 4 |
| 5 | 171.2803 | 171 | 4.9820 | 5 |
| 6 | 186.0796 | 186 | 5.9944 | 6 |
| 7 | 199.5856 | 200 | 7.0320 | 7 |

TABLE 2-continued

N = 256
P = 1024
γ = 2.2
S = (P − 1) = 1023

$$O = \mathrm{INT}\left[(P-1)\left(\frac{I}{N-1}\right)^{\frac{1}{y}} + 0.5\right]$$

$$I = \mathrm{INT}\left[(N-1)\left(\frac{O}{P-1}\right)^{y} + 0.5\right]$$

| I | | O | | I |
|---|---|---|---|---|
| 8 | 212.0749 | 212 | 7.9938 | 8 |
| 9 | 223.7383 | 224 | 9.0232 | 9 |
| 10 | 234.7141 | 235 | 10.0268 | 10 |
| 11 | 245.1061 | 245 | 10.9895 | 11 |
| 12 | 254.9944 | 255 | 12.0006 | 12 |
| 13 | 264.4427 | 264 | 12.9522 | 13 |
| 14 | 273.5023 | 274 | 14.0561 | 14 |
| 15 | 282.2154 | 282 | 14.9748 | 15 |
| 16 | 290.6170 | 291 | 16.0464 | 16 |
| 17 | 298.7368 | 299 | 17.0330 | 17 |
| 18 | 306.6000 | 307 | 18.0517 | 18 |
| 19 | 314.2284 | 314 | 18.9696 | 19 |
| 20 | 321.6407 | 322 | 20.0492 | 20 |
| 21 | 328.8535 | 329 | 21.0206 | 21 |
| 22 | 335.8813 | 336 | 22.0171 | 22 |
| 23 | 342.7370 | 343 | 23.0389 | 23 |
| 24 | 349.4319 | 349 | 23.9348 | 24 |
| 25 | 355.9762 | 356 | 25.0037 | 25 |
| 26 | 362.3794 | 362 | 25.9402 | 26 |
| 27 | 368.6495 | 369 | 27.0565 | 27 |
| 28 | 374.7942 | 375 | 28.0338 | 28 |
| 29 | 380.8203 | 381 | 29.0301 | 29 |
| 30 | 386.7341 | 387 | 30.0454 | 30 |
| 31 | 392.5414 | 393 | 31.0797 | 31 |
| 32 | 398.2473 | 398 | 31.9563 | 32 |
| 33 | 403.8568 | 404 | 33.0258 | 33 |
| 34 | 409.3743 | 409 | 33.9317 | 34 |
| 35 | 414.8039 | 415 | 35.0364 | 35 |
| 36 | 420.1496 | 420 | 35.9718 | 36 |
| 37 | 425.4149 | 425 | 36.9207 | 37 |
| 38 | 430.6031 | 431 | 38.0771 | 38 |
| 39 | 435.7174 | 436 | 39.0557 | 39 |
| 40 | 440.7607 | 441 | 40.0478 | 40 |
| 41 | 445.7356 | 446 | 41.0535 | 41 |
| 42 | 450.6448 | 451 | 42.0729 | 42 |
| 43 | 455.4906 | 455 | 42.8982 | 43 |
| 44 | 460.2753 | 460 | 43.9421 | 44 |
| 45 | 465.0011 | 465 | 44.9998 | 45 |
| 46 | 469.6699 | 470 | 46.0712 | 46 |
| 47 | 474.2837 | 474 | 46.9382 | 47 |
| 48 | 478.8443 | 479 | 48.0343 | 48 |
| 49 | 483.3533 | 483 | 48.9212 | 49 |
| 50 | 487.8124 | 488 | 50.0423 | 50 |
| 51 | 492.2231 | 492 | 50.9492 | 51 |
| 52 | 496.5869 | 497 | 52.0952 | 52 |
| 53 | 500.9052 | 501 | 53.0221 | 53 |
| 54 | 505.1793 | 505 | 53.9579 | 54 |
| 55 | 509.4103 | 509 | 54.9026 | 55 |
| 56 | 513.5996 | 514 | 56.0961 | 56 |
| 57 | 517.7483 | 518 | 57.0610 | 57 |
| 58 | 521.8575 | 522 | 58.0349 | 58 |
| 59 | 525.9282 | 526 | 59.0177 | 59 |
| 60 | 529.9615 | 530 | 60.0096 | 60 |
| 61 | 533.9582 | 534 | 61.0105 | 61 |
| 62 | 537.9194 | 538 | 62.0204 | 62 |
| 63 | 541.8459 | 542 | 63.0394 | 63 |
| 64 | 545.7386 | 546 | 64.0675 | 64 |
| 65 | 549.5982 | 550 | 65.1046 | 65 |
| 66 | 553.4255 | 553 | 65.8884 | 66 |
| 67 | 557.2213 | 557 | 66.9415 | 67 |
| 68 | 560.9864 | 561 | 68.0036 | 68 |
| 69 | 564.7214 | 565 | 69.0749 | 69 |
| 70 | 568.4270 | 568 | 69.8844 | 70 |
| 71 | 572.1038 | 572 | 70.9717 | 71 |
| 72 | 575.7524 | 576 | 72.0681 | 72 |
| 73 | 579.3736 | 579 | 72.8965 | 73 |
| 74 | 582.9677 | 583 | 74.0090 | 74 |
| 75 | 586.5355 | 587 | 75.1307 | 75 |
| 76 | 590.0774 | 590 | 75.9781 | 76 |
| 77 | 593.5940 | 594 | 77.1159 | 77 |
| 78 | 597.0858 | 597 | 77.9753 | 78 |
| 79 | 600.5532 | 601 | 79.1294 | 79 |
| 80 | 603.9968 | 604 | 80.0009 | 80 |
| 81 | 607.4170 | 607 | 80.8777 | 81 |
| 82 | 610.8142 | 611 | 82.0549 | 82 |
| 83 | 614.1889 | 614 | 82.9429 | 83 |
| 84 | 617.5415 | 618 | 84.1373 | 84 |
| 85 | 620.8724 | 621 | 85.0384 | 85 |
| 86 | 624.1820 | 624 | 85.9449 | 86 |
| 87 | 627.4706 | 627 | 86.8565 | 87 |
| 88 | 630.7387 | 631 | 88.0802 | 88 |
| 89 | 633.9866 | 634 | 89.0041 | 89 |
| 90 | 637.2147 | 637 | 89.9333 | 90 |
| 91 | 640.4233 | 640 | 90.8677 | 91 |
| 92 | 643.6126 | 644 | 92.1219 | 92 |
| 93 | 646.7832 | 647 | 93.0686 | 93 |
| 94 | 649.9352 | 650 | 94.0206 | 94 |
| 95 | 653.0689 | 653 | 94.9779 | 95 |
| 96 | 656.1847 | 656 | 95.9406 | 96 |
| 97 | 659.2829 | 659 | 96.9085 | 97 |
| 98 | 662.3637 | 662 | 97.8817 | 98 |
| 99 | 665.4273 | 665 | 98.8602 | 99 |
| 100 | 668.4742 | 668 | 99.8440 | 100 |
| 101 | 671.5045 | 672 | 101.1640 | 101 |
| 102 | 674.5184 | 675 | 102.1603 | 102 |
| 103 | 677.5163 | 678 | 103.1618 | 103 |
| 104 | 680.4983 | 680 | 103.8325 | 104 |
| 105 | 683.4648 | 683 | 104.8430 | 105 |
| 106 | 686.4159 | 686 | 105.8588 | 106 |
| 107 | 689.3518 | 689 | 106.8799 | 107 |
| 108 | 692.2728 | 692 | 107.9064 | 108 |
| 109 | 695.1791 | 695 | 108.9382 | 109 |
| 110 | 698.0708 | 698 | 109.9754 | 110 |
| 111 | 700.9483 | 701 | 111.0180 | 111 |
| 112 | 703.8117 | 704 | 112.0659 | 112 |
| 113 | 706.6611 | 707 | 113.1192 | 113 |
| 114 | 709.4969 | 709 | 113.8244 | 114 |
| 115 | 712.3191 | 712 | 114.8867 | 115 |
| 116 | 715.1279 | 715 | 115.9544 | 116 |
| 117 | 717.9236 | 718 | 117.0274 | 117 |
| 118 | 720.7062 | 721 | 118.1058 | 118 |
| 119 | 723.4761 | 723 | 118.8278 | 119 |
| 120 | 726.2332 | 726 | 119.9152 | 120 |
| 121 | 728.9779 | 729 | 121.0081 | 121 |
| 122 | 731.7102 | 732 | 122.1063 | 122 |
| 123 | 734.4303 | 734 | 122.8415 | 123 |
| 124 | 737.1384 | 737 | 123.9488 | 124 |
| 125 | 739.8346 | 740 | 125.0615 | 125 |
| 126 | 742.5191 | 743 | 126.1796 | 126 |
| 127 | 745.1920 | 745 | 126.9280 | 127 |
| 128 | 747.8534 | 748 | 128.0552 | 128 |
| 129 | 750.5035 | 751 | 129.1878 | 129 |
| 130 | 753.1424 | 753 | 129.9459 | 130 |
| 131 | 755.7702 | 756 | 131.0876 | 131 |
| 132 | 758.3872 | 758 | 131.8518 | 132 |
| 133 | 760.9933 | 761 | 133.0026 | 133 |
| 134 | 763.5888 | 764 | 134.1588 | 134 |
| 135 | 766.1737 | 766 | 134.9327 | 135 |
| 136 | 768.7483 | 769 | 136.0980 | 136 |
| 137 | 771.3125 | 771 | 136.8779 | 137 |
| 138 | 773.8665 | 774 | 138.0524 | 138 |
| 139 | 776.4105 | 776 | 138.8384 | 139 |

TABLE 2-continued

N = 256
P = 1024
$\gamma = 2.2$
S = (P − 1) = 1023

$$O = \mathrm{INT}\left[(P-1)\left(\frac{I}{N-1}\right)^{\frac{1}{\gamma}} + 0.5\right]$$

$$I = \mathrm{INT}\left[(N-1)\left(\frac{O}{P-1}\right)^{\gamma} + 0.5\right]$$

| I | O | | I | |
|---|---|---|---|---|
| 140 | 778.9444 | 779 | 140.0220 | 140 |
| 141 | 781.4686 | 781 | 140.8141 | 141 |
| 142 | 783.9830 | 784 | 142.0068 | 142 |
| 143 | 786.4877 | 786 | 142.8050 | 143 |
| 144 | 788.9829 | 789 | 144.0069 | 144 |
| 145 | 791.4687 | 791 | 144.8112 | 145 |
| 146 | 793.9451 | 794 | 146.0222 | 146 |
| 147 | 796.4123 | 796 | 146.8326 | 147 |
| 148 | 798.8704 | 799 | 148.0528 | 148 |
| 149 | 801.3194 | 801 | 148.8694 | 149 |
| 150 | 803.7595 | 804 | 150.0988 | 150 |
| 151 | 806.1907 | 806 | 150.9214 | 151 |
| 152 | 808.6132 | 809 | 152.1600 | 152 |
| 153 | 811.0270 | 811 | 152.9888 | 153 |
| 154 | 813.4322 | 813 | 153.8201 | 154 |
| 155 | 815.8288 | 816 | 155.0716 | 155 |
| 156 | 818.2171 | 818 | 155.9090 | 156 |
| 157 | 820.5970 | 821 | 157.1697 | 157 |
| 158 | 822.9687 | 823 | 158.0132 | 158 |
| 159 | 825.3322 | 825 | 158.8592 | 159 |
| 160 | 827.6876 | 828 | 160.1329 | 160 |
| 161 | 830.0350 | 830 | 160.9851 | 161 |
| 162 | 832.3745 | 832 | 161.8397 | 162 |
| 163 | 834.7060 | 835 | 163.1263 | 163 |
| 164 | 837.0298 | 837 | 163.9871 | 164 |
| 165 | 839.3459 | 839 | 164.8504 | 165 |
| 166 | 841.6544 | 842 | 166.1500 | 166 |
| 167 | 843.9552 | 844 | 167.0195 | 167 |
| 168 | 846.2486 | 846 | 167.8915 | 168 |
| 169 | 848.5345 | 849 | 169.2040 | 169 |
| 170 | 850.8131 | 851 | 170.0822 | 170 |
| 171 | 853.0842 | 853 | 170.9628 | 171 |
| 172 | 855.3484 | 855 | 171.8459 | 172 |
| 173 | 857.6052 | 858 | 173.1752 | 173 |
| 174 | 859.8550 | 860 | 174.0646 | 174 |
| 175 | 862.0977 | 862 | 174.9564 | 175 |
| 176 | 864.3334 | 864 | 175.8507 | 176 |
| 177 | 866.5622 | 867 | 177.1968 | 177 |
| 178 | 868.7842 | 869 | 178.0973 | 178 |
| 179 | 870.9994 | 871 | 179.0003 | 179 |
| 180 | 873.2078 | 873 | 179.9058 | 180 |
| 181 | 875.4095 | 875 | 180.8138 | 181 |
| 182 | 877.6046 | 878 | 182.1804 | 182 |
| 183 | 879.7932 | 880 | 183.0947 | 183 |
| 184 | 881.9752 | 882 | 184.0114 | 184 |
| 185 | 884.1508 | 884 | 184.9306 | 185 |
| 186 | 886.3200 | 886 | 185.8523 | 186 |
| 187 | 888.4828 | 888 | 186.7765 | 187 |
| 188 | 890.6393 | 891 | 188.1676 | 188 |
| 189 | 892.7896 | 893 | 189.0980 | 189 |
| 190 | 894.9336 | 895 | 190.0310 | 190 |
| 191 | 897.0715 | 897 | 190.9665 | 191 |
| 192 | 899.2034 | 899 | 191.9045 | 192 |
| 193 | 901.3292 | 901 | 192.8450 | 193 |
| 194 | 903.4489 | 903 | 193.7880 | 194 |
| 195 | 905.5628 | 906 | 195.2072 | 195 |
| 196 | 907.6707 | 908 | 196.1565 | 196 |
| 197 | 909.7728 | 910 | 197.1083 | 197 |
| 198 | 911.8690 | 912 | 198.0626 | 198 |
| 199 | 913.9595 | 914 | 199.0194 | 199 |
| 200 | 916.0443 | 916 | 199.9787 | 200 |
| 201 | 918.1234 | 918 | 200.9406 | 201 |
| 202 | 920.1968 | 920 | 201.9050 | 202 |
| 203 | 922.2647 | 922 | 202.8719 | 203 |
| 204 | 924.3270 | 924 | 203.8413 | 204 |
| 205 | 926.3838 | 926 | 204.8132 | 205 |

TABLE 2-continued

N = 256
P = 1024
$\gamma = 2.2$
S = (P − 1) = 1023

$$O = \mathrm{INT}\left[(P-1)\left(\frac{I}{N-1}\right)^{\frac{1}{\gamma}} + 0.5\right]$$

$$I = \mathrm{INT}\left[(N-1)\left(\frac{O}{P-1}\right)^{\gamma} + 0.5\right]$$

| I | O | | I | |
|---|---|---|---|---|
| 206 | 928.4351 | 928 | 205.7877 | 206 |
| 207 | 930.4810 | 930 | 206.7646 | 207 |
| 208 | 932.5216 | 933 | 208.2348 | 208 |
| 209 | 934.5568 | 935 | 209.2181 | 209 |
| 210 | 936.5866 | 937 | 210.2040 | 210 |
| 211 | 938.6113 | 939 | 211.1923 | 211 |
| 212 | 940.6306 | 941 | 212.1832 | 212 |
| 213 | 942.6449 | 943 | 213.1766 | 213 |
| 214 | 944.6539 | 945 | 214.1725 | 214 |
| 215 | 946.6578 | 947 | 215.1710 | 215 |
| 216 | 948.6567 | 949 | 216.1720 | 216 |
| 217 | 950.6505 | 951 | 217.1755 | 217 |
| 218 | 952.6393 | 953 | 218.1816 | 218 |
| 219 | 954.6232 | 955 | 219.1902 | 219 |
| 220 | 956.6021 | 957 | 220.2014 | 220 |
| 221 | 958.5761 | 959 | 221.2151 | 221 |
| 222 | 960.5452 | 961 | 222.2313 | 222 |
| 223 | 962.5095 | 963 | 223.2501 | 223 |
| 224 | 964.4690 | 964 | 223.7604 | 224 |
| 225 | 966.4238 | 966 | 224.7830 | 225 |
| 226 | 968.3738 | 968 | 225.8081 | 226 |
| 227 | 970.3191 | 970 | 226.8358 | 227 |
| 228 | 972.2597 | 972 | 227.8660 | 228 |
| 229 | 974.1957 | 974 | 228.8988 | 229 |
| 230 | 975.1271 | 976 | 229.9341 | 230 |
| 231 | 978.0540 | 978 | 230.9720 | 231 |
| 232 | 979.9762 | 980 | 232.0124 | 232 |
| 233 | 981.8940 | 982 | 233.0553 | 233 |
| 234 | 983.8073 | 984 | 234.1009 | 234 |
| 235 | 985.7161 | 986 | 235.1489 | 235 |
| 236 | 987.6205 | 988 | 236.1995 | 236 |
| 237 | 989.5205 | 990 | 237.2527 | 237 |
| 238 | 991.4161 | 991 | 237.7803 | 238 |
| 239 | 993.3074 | 993 | 238.8373 | 239 |
| 240 | 995.1944 | 995 | 239.8969 | 240 |
| 241 | 997.0771 | 997 | 240.9590 | 241 |
| 242 | 998.9556 | 999 | 242.0237 | 242 |
| 243 | 1000.8298 | 1001 | 243.0909 | 243 |
| 244 | 1002.6998 | 1003 | 244.1607 | 244 |
| 245 | 1004.5656 | 1005 | 245.2331 | 245 |
| 246 | 1006.4273 | 1006 | 245.7703 | 246 |
| 247 | 1008.2849 | 1008 | 246.8465 | 247 |
| 248 | 1010.1384 | 1010 | 247.9253 | 248 |
| 249 | 1011.9877 | 1012 | 249.0066 | 249 |
| 250 | 1013.8331 | 1014 | 250.0906 | 250 |
| 251 | 1015.6744 | 1016 | 251.1770 | 251 |
| 252 | 1017.5118 | 1018 | 252.2661 | 252 |
| 253 | 1019.3451 | 1019 | 252.8116 | 253 |
| 254 | 1021.1745 | 1021 | 253.9045 | 254 |
| 255 | 1023.0000 | 1023 | 255.0000 | 255 |

256 unique + 0 duplicates = 256 total

We claim:

1. An image display system comprising:

a source of image pixel data wherein each pixel has an M-bit value within a first non-linear range of values;

first means, coupled to an output of said source, for converting each of said M-bit pixel values to an N-bit pixel value within a linear range of values;

storage means, having an input coupled to an output of said first converting means, for storing the N-bit pixel values; and second means, coupled to an output of said storage means, for converting N-bit pixel values output by said storage means to P-bit pixel values within a second non-linear range of values, said second means converting the N-bit pixel values prior to an application of said converted P-bit pixel values to a display means.

2. An image display system as set forth in claim 1 wherein said first converting means operates in accordance with a gamma correction function and wherein said second converting means operates in accordance with an inverse gamma correction function.

3. An image display system as set forth in claim 1 wherein said first converting means includes a first memory means having address inputs coupled to said M-bit pixel values, said first memory means having a plurality of entries each of which stores a gamma corrected pixel value.

4. An image display system as set forth in claim 3 wherein said second converting means includes a second memory means having address inputs coupled to said N-bit pixel values, said second memory means having a plurality of entries each of which stores an inverse gamma corrected pixel value.

5. An image display system as set forth in claim 4 wherein said first memory means and said second memory means are each coupled to means for storing said corrected pixel values therein.

6. An image display system as set forth in claim 4 wherein said second memory means stores a plurality of sets of inverse gamma corrected pixel values, and wherein said storage means further stores, in association with each of the N-bit pixel values, a value that specifies a particular one of said plurality of sets of inverse gamma corrected pixel values for use in converting an associated one of said N-bit pixel values.

7. An image display system as set forth in claim 1 wherein M is greater than N and wherein P is equal to or greater than N.

8. An image display system as set forth in claim 1 wherein P and N are related to an expression $E=[S(e)^{1/y}/S]^{y}$, where E is a video signal voltage and where y is a power function exponent, both of which are associated with the display means, and where the coefficient S satisfies the following relations:

$$O=INT[P-1)(I/N-1)^{1/y}+0.5] \text{ and}$$

$$I=INT[(N-1)(O/P-1)^{y}+0.5],$$

where N=a number of linear input (I) levels, P=a number of gamma corrected output (O) levels, (I/N−1) and (O/P−1) are normalized input and output values, respectively, S=P−1, and INT is a truncating integer function.

9. An image display system as set forth in claim 1 wherein said source includes a camera having means for inverse gamma correcting a signal generated by said camera.

10. An image display system as set forth in claim 9 wherein said source further includes an analog-to-digital conversion means having an input for receiving the inverse gamma corrected signal from said camera and an output for expressing the inverse gamma corrected signal with M-bits.

11. An image display system as set forth in claim 1 and further including a digital-to-analog conversion means having a P-bit input coupled to an output of said second converting means.

12. A method of operating an image display system, comprising the steps of:

generating image pixel data wherein each pixel has an M-bit value within a first non-linear range of values;

converting each of the M-bit pixel values to an N-bit pixel value within a linear range of values;

storing the N-bit pixel values; and converting N-bit pixel values output by said storage means to P-bit pixel values within a second non-linear range of values.

13. A method as set forth in claim 12 and including a step of applying the converted P-bit pixel data to a display means.

14. A method as set forth in claim 12 wherein said first step of converting operates in accordance with a gamma correction function and wherein the second step of converting operates in accordance with an inverse gamma correction function.

15. A method as set forth in claim 12 wherein said second step of converting converts the N-bit pixel values in accordance with one of a plurality of sets of inverse gamma corrected pixel values.

16. A method as set forth in claim 15 wherein the second step of converting includes a step of specifying, for each N-bit pixel value, a particular one of the plurality of sets of inverse gamma corrected pixel values.

17. A method as set forth in claim 12 wherein M is greater than N and wherein P is equal to or greater than N.

18. A method as set forth in claim 13 wherein M and N are related to an expression $E=[S(e)^{1/y}/S]^{y}$, where E is a video signal voltage and where y is a power function exponent both of which are associated with the display means, and where the coefficient S satisfies the following relations:

$$O=INT[P-1)(I/N-1)^{1/y}+0.5] \text{ and}$$

$$I=INT[(N-1)(O/P-1)^{y}+0.5],$$

where N=a number of linear input (I) levels, P=a number of gamma corrected output (O) levels, (I/N−1) and (O/P−1) are normalized input and output values, respectively, S=P−1, and INT is a truncating integer function.

19. A method as set forth in claim 12 wherein the step of generating includes a step of inverse gamma correcting a signal generated by a camera.

20. A method as set forth in claim 19 wherein the step of generating includes a step of analog-to-digital converting the inverse gamma corrected signal from the camera into a digital representation thereof, the digital representation having M-bits.

21. A method as set forth in claim 12 and further including a step of digital-to-analog converting the P-bit pixel values.

22. An image display system comprising:

a source of inverse gamma corrected image pixel data wherein each pixel is expressed with M-bits;

means, coupled to an output of said source, for gamma correcting each of said M-bit pixel values to an N-bit value within a linear range of values;

frame buffer means, having an input coupled to an output of said first converting means, for storing the gamma converted N-bit pixel values;

means, coupled to an output of said frame buffer means, for inverse gamma correcting N-bit pixel values output by said frame buffer means to P-bit pixel values; and means, coupled to an output of said inverse gamma correcting means, for converting the P-bit pixel data to an analog voltage for driving a CRT-display means.

23. An image display system as set forth in claim 22 wherein M is greater than N and wherein P is equal to or greater than N.

24. An image display system as set forth in claim 22 wherein said gamma correcting means includes a first look-up table means having address inputs coupled to said M-bit pixel values; and wherein said inverse gamma correcting means includes a second look-up table means having address inputs coupled to said N-bit pixel values.

25. An image display system as set forth in claim 24 wherein said first look-up table means and said second look-up table means are each coupled to a host means operable for storing gamma correction values and inverse gamma correction values, respectively, therein.

26. An image display system as set forth in claim 22 wherein said frame buffer means is coupled to a host means operable for storing N-bit image pixel data therein.

27. An image display system as set forth in claim 24 wherein said second look-up table means stores a plurality of sets of inverse gamma corrected pixel values, and wherein said frame buffer means further stores, in association with each of the N-bit pixel values, a value expressed with W-bits that specifies a particular one of said plurality of sets of inverse gamma corrected pixel values for use in converting an associated one of said N-bit pixel values.

28. An image display system as set forth in claim 27 wherein said frame buffer means is comprised of xN+W-bit memory planes, where x is a number of color signal inputs to said CRT-display means.

29. An image display system comprising:

a source of image pixel data wherein each pixel has an M-bit value within a non-linear range of values;

first means, coupled to an output of said source, for converting each of said M-bit pixel values to an N-bit value within a linear range of values;

storage means, having an input coupled to an output of said first converting means, for storing the N-bit pixel values; and second means, coupled to an output of said storage means, for converting N-bit pixel values output by said storage means to P-bit pixel values within a non-linear range of values, said second means converting the N-bit pixel values prior to an application of said converted P-bit pixel values to a display means; wherein P and N are both related to an expression $E=[S(e)^{1/y}/S]^y$, where E is a video signal voltage and where y is a power function exponent, both of which are associated with the display means, and where the coefficient S satisfies the following relations:

$$O=INT[P-1)(I/N-1)^{1/y}+0.5] \text{ and}$$

$$I=INT[(N-1)(O/P-1)^y+0.5],$$

where N=a number of linear input (I) levels, P=a number of gamma corrected output (O) levels, (I/N−1) and (O/P−1) are normalized input and output values, respectively, S=P−1, and INT is a truncating integer function.

30. Apparatus for use in displaying an image with a display means, comprising:

frame buffer means having a plurality of entries each of which stores information for one display means pixel, each of said entries comprising N+W bits; and memory means having address inputs coupled to an output of said frame buffer means for receiving N+W bits therefrom, said memory means storing W sets of N entries, each of said N entries storing a predetermined pixel value modification factor, wherein said W bits received from said frame buffer means selects one of said W sets of N entries, and wherein said N bits received from said frame buffer means selects one of said predetermined pixel value modification factors within the selected set.

31. Apparatus as set forth in claim 30 wherein said W bits specify an identity of a display means window, and wherein each of said predetermined pixel modification factors specifies an inverse gamma correction factor that has a value that is a function of the display means.

* * * * *